United States Patent [19]

Johnson et al.

[11] 4,031,507

[45] June 21, 1977

[54] TRAFFIC CONTROLLER, ELECTROMECHANICAL SEQUENCER FOR A TRAFFIC CONTROLLER

[75] Inventors: Ronald P. Johnson, San Jose; Reynold W. Bell, Santa Clara, both of Calif.

[73] Assignee: The Singer Company, Binghamton, N.Y.

[22] Filed: Aug. 2, 1976

[21] Appl. No.: 711,013

Related U.S. Application Data

[63] Continuation of Ser. No. 485,074, July 2, 1974, abandoned.

[52] U.S. Cl. .............................. 340/41 R; 340/37
[51] Int. Cl.² .......................................... G08G 1/00
[58] Field of Search ...................... 340/37, 41, 40

[56] References Cited

UNITED STATES PATENTS

| | | | |
|---|---|---|---|
| 3,090,032 | 5/1963 | Shand | 340/40 |
| 3,605,084 | 9/1971 | Matysek | 340/40 |
| 3,815,085 | 6/1974 | Leclercq | 340/41 R |

*Primary Examiner*—Thomas B. Habecker
*Attorney, Agent, or Firm*—Paul Hentzel; James C. Kesterson

[57] ABSTRACT

The phase sequence of a traffic light is determined by a reprogramable revolving encoder. In one embodiment the encoder has a light source and a drum revolving therearound with selectively positioned apertures. Photocells positioned outside the drum detect the apertures as they move passed to control the light switches in the traffic controller. Some photocells may be deactivated subject to DEMAND, causing the associated traffic phase to be omitted each cycle unless street traffic trips an activation circuit. The encoder has a homing circuit for startup and synchronization with associated traffic lights.

15 Claims, 6 Drawing Figures

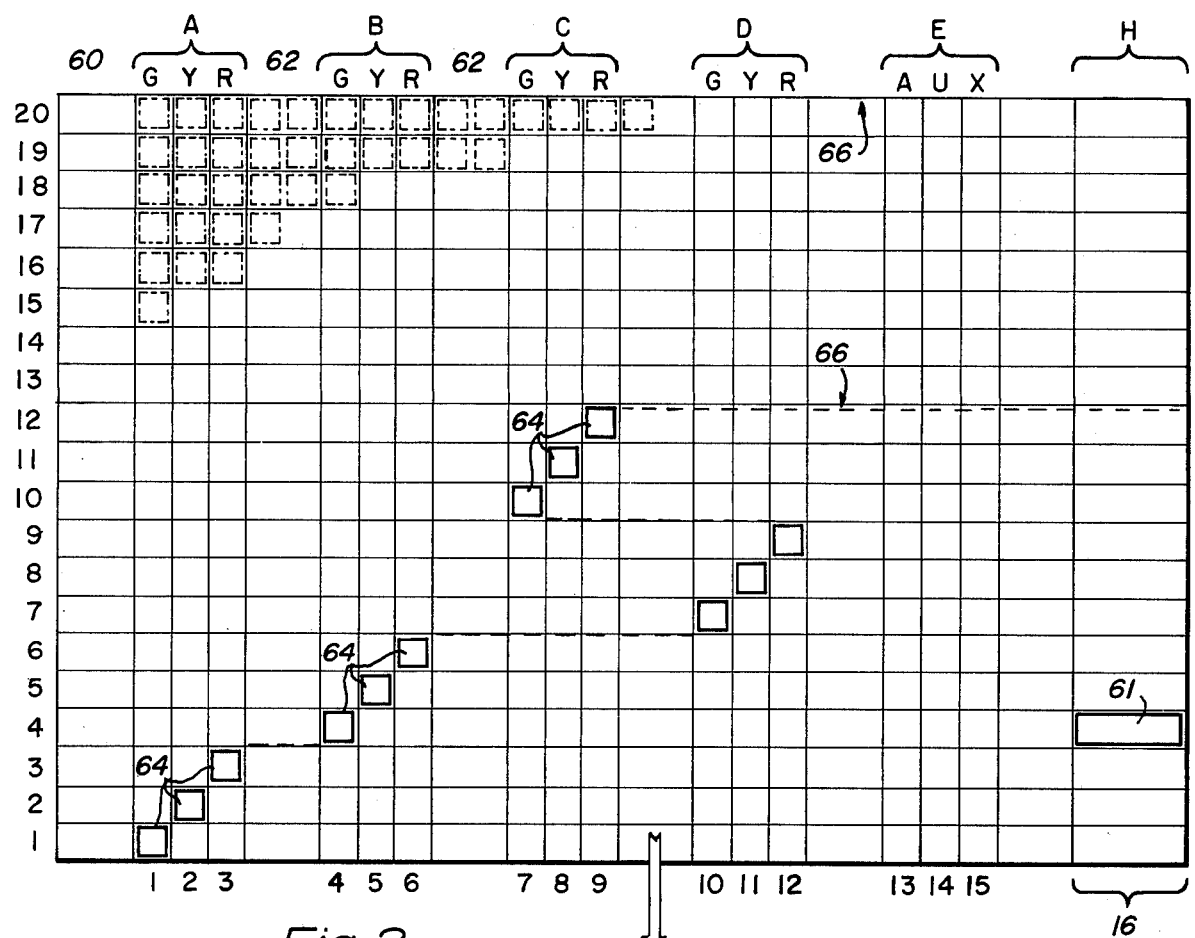
Fig_2
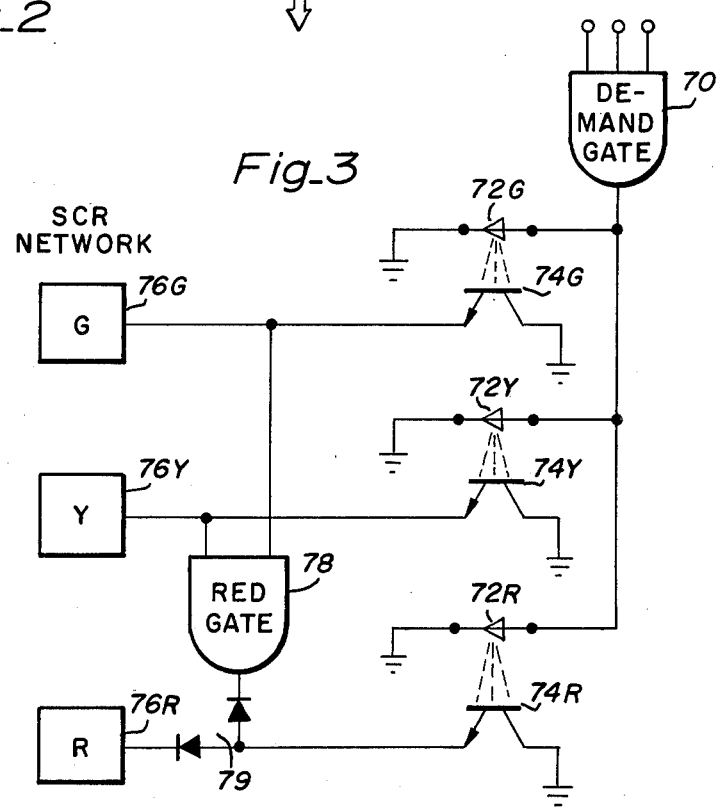
Fig_3

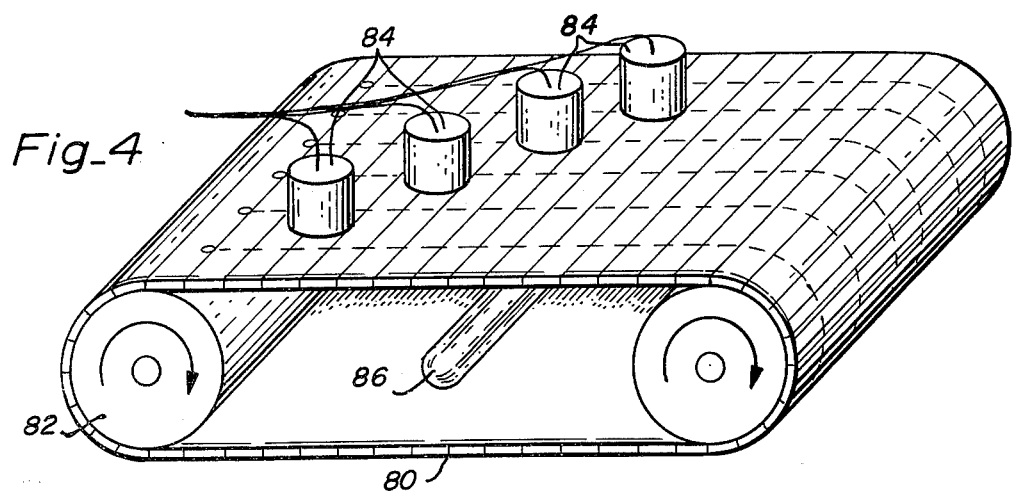
Fig_4
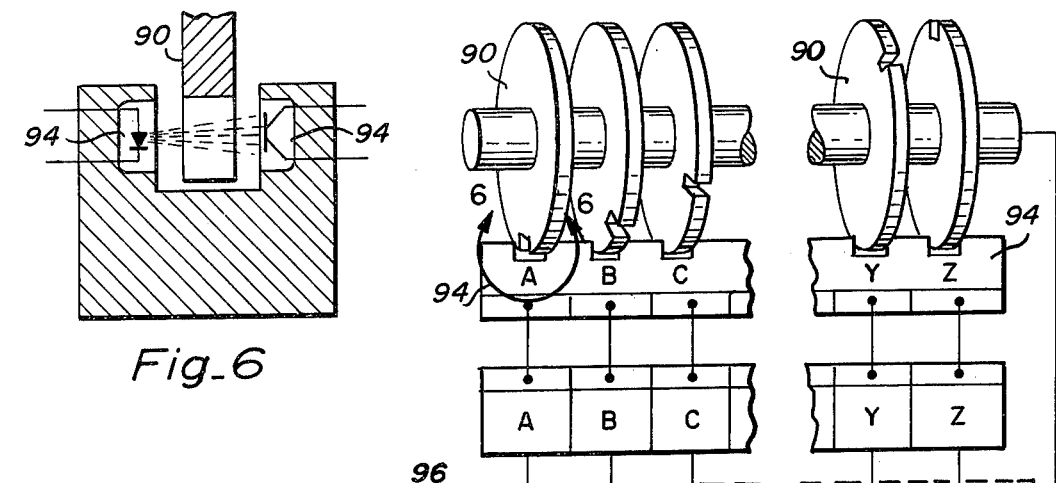
Fig_6
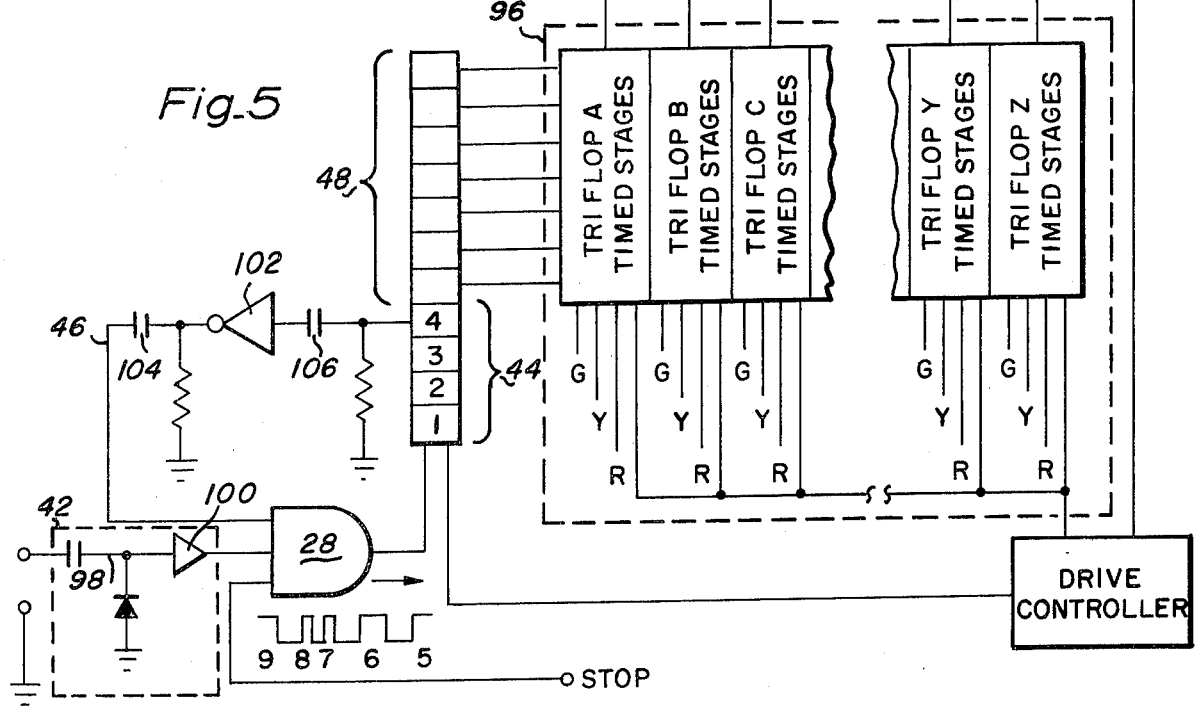
Fig_5

TRAFFIC CONTROLLER, ELECTROMECHANICAL SEQUENCER FOR A TRAFFIC CONTROLLER

This is a continuation of application Ser. No. 485,074, filed July 2, 1974 and now abandoned.

BACKGROUND OF THE INVENTION

1. Field of the Invention

This invention relates to traffic controllers, and more particularly to a traffic phase sequencer within a traffic controller.

2. Description of the Prior Art

Heretofore the phase sequence and interval timing in traffic controllers has been accomplished by a slowly revolving cammer and cam operated switches in series with solonoids which energized the traffic lights. The sequence and interval lengths could be changed only by disassembling the camming mechanism and reordering and repositioning the cams. Reprogramming a traffic intersection could involve replacing the cam from a cam inventory.

It is therefore an object of this invention to provide a traffic controller that may easily be reprogrammed and does not require an inventory of special parts.

Advancing the yellow cam in this prior art traffic controller to lengthen the yellow interval resulted in shortening the preceding green interval. The continuously rotating cammer defined a fixed complete cycle time and a rigid time relationship among the intervals forming the complete cycle. Similarly, if an entire green-yellow-red phase were skipped for lack of DEMAND the timing of the other phases was disrupted.

It is therefore another object of this invention to provide a traffic controller in which each colored interval may be adjusted in period without affecting the adjacent intervals, and in which an entire phase may have a DEMAND contingency status without affecting the other phases.

Further, if one of the cam operated switches of this prior art device malfunctioned, synchronism between the cams and the colored traffic lights was lost causing the time intervals to be applied to the wrong light color. Homing cams periodically restored synchronism, but in the meantime the color intervals had unusual time periods which confused motorists.

It is therefore a further object of this invention to provide a traffic controller which has inherent and absolute synchronization between the interval time period and the interval color.

The prior art cams frictionally engaged cam followers and mechanically displaced them to operate the switches. The displaced cam followers were returned to the uncammed position by return springs. Overcoming this spring load and the friction introduced thereby required a finite force which dictated a suitably powered camming motor, and a heavy frame member capable of withstanding the strains thus generated. Further, misalignment of the axis of rotation due to wear or low manufacturing tolerences increased the frictional engagement between adjacent moving surfaces which increased the motor load.

It is therefore yet another object of this invention to provide a traffic controller sequencer which does not frictionally engage or displace cooperating structure and therefore has a lower power and weight requirement.

SUMMARY OF THE INVENTION

Briefly these and other objects are achieved by providing a program device with propositioned structure thereon corresponding to events in the traffic controller cycle, and a sensor array capable of detecting the propositioned structure. A drive motor is provided to establish motion between the program device and the sensor array permitting the array to read the sequence of propositioned structure on the program device. Switches are provided responsive to the sensor array for controlling the sequence of traffic light events. A drive controller is provided to establish the motor during reading and to prevent the motion during the event.

BRIEF DESCRIPTION OF THE DRAWING

Further objects and advantages of the present traffic controller and operation of the sequencer will become apparent from the following detailed description taken in conjunction with the drawings in which:

FIG. 2 is a top view of a modified memory drum laid out flat showing that special relationship of the apertures;

FIG. 3 is a schematic diagram for a DEMAND circuit for activating the photocircuits of a traffic phase subject to DEMAND;

FIG. 4 is an isometric view of a belt embodiment of the memory drum;

FIG. 5 is schematic-isometric view of a revolving disc embodiment; and

FIG. 6 is an enlarged fragmentary view showing a single LED pototransister pair from the FIG. 5 array.

DESCRIPTION OF THE PREFERRED EMBODIMENTS

Figure 1:
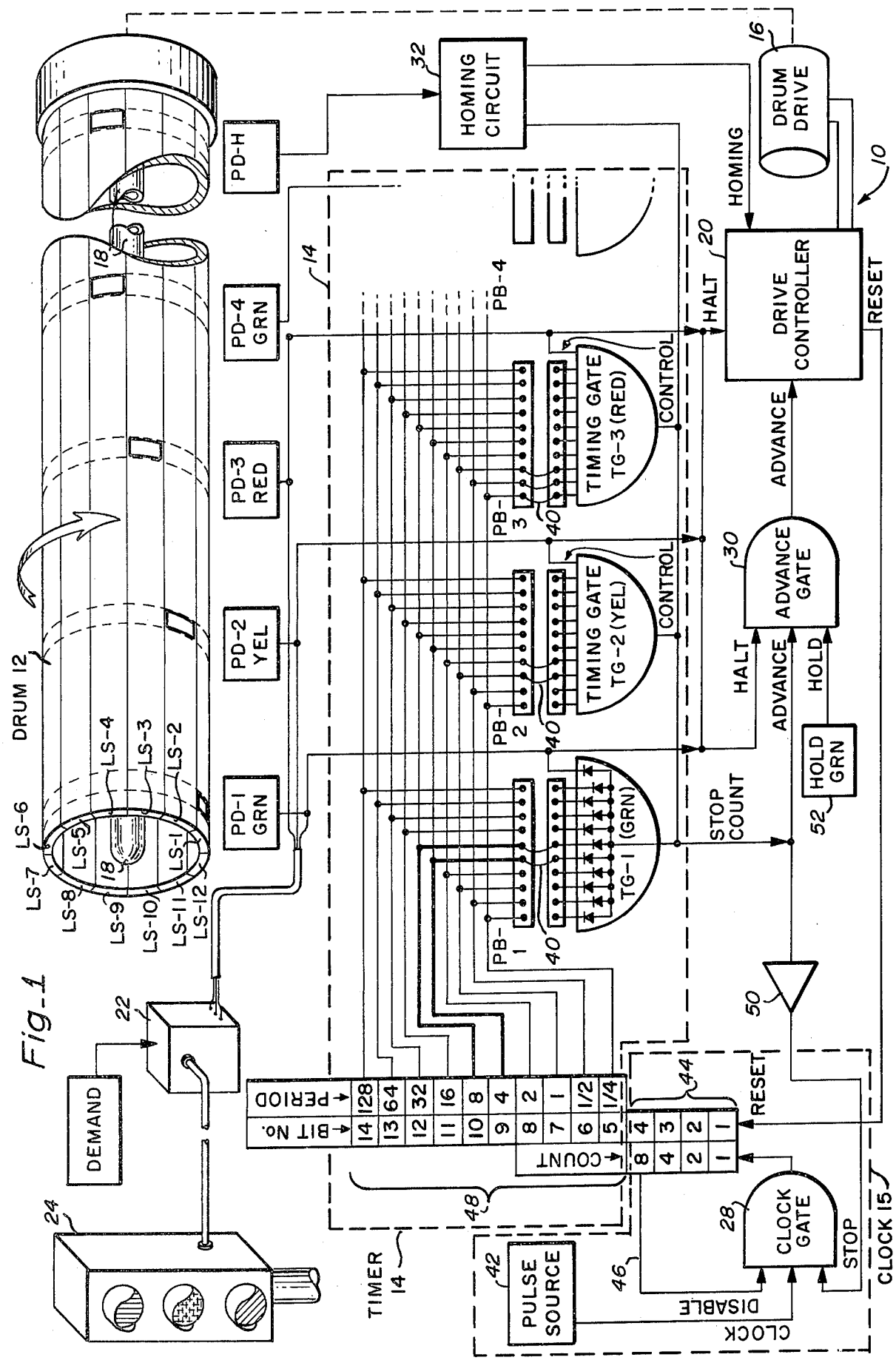
FIG. 1 is a schematic-isometric view showing an incrementally advance revolving drum and associated advance and timing circuits.

Referring to FIG. 1, there is shown a traffic controller to having a suitable memory or program device such as sequencing cylinder or drum 12, an interval timer 14, a clock circuit 15 and drive device such as motor 16 for incrementally turning drum 12. Drum 12 has an angular position for each traffic light interval. In this example there are 12 light intervals, four phases each with a green, yellow and red interval corresponding to longitudinal segments LS-1 to LS-12 in FIG. 1. Drun 12 also has a series of circumferential tracks Tr-1 to Tr-12, one track for each interval. Interval apertures Ap-1 to Ap-12 are located on the surface of drum 12 where the radial track for each interval intersects the angular position segment for the same interval. The interval apertures communicate light from a light source 18 within drum 12 to an array of photo detectors PD-1 to PD-12 positioned outside of drum 12. One photo detector is associated with each interval track Tr-1 to Tr-12, and is activated by the aperture in that track as drun 12 rotates. The order of light detector activation and thus the interval sequence, is predetermined by the locations of apertures Ap-1 to Ap-12 on drum 12. The interval sequence or traffic program may be changed by exchanging program drum 12 for another program drum with the desired sequence.

Drum 12 is in a HALT status during the interval timing by timer 14 and rotates to the next angular position when the interval time expires. The leading edge of the interval apertures activates the associated photodetector generating a HALT COMMAND at the HALT input to a drive controller 20 causing drive 16 and drum 12 to stop. Further, the output of each photodetector is applied separately to a light switch 22 which energizes the appropriate green, yellow, or red interval light in the traffic light housing 24. As shown in FIG. 1 the green light is energized by photodetector PD-1 (Grn) which in turn is activated by light through aperture Ap-1. Drum 12 is stationary maintaining alignment between aperture Ap-1 on track Tr-1 and photodetector PD-1 (Grn).

The HALT COMMAND to drive controller 20 stops drive 16 and initiates a RESET COMMAND from controller 20 to a counter 26 for initiating the counting of the green interval in timer 14. A clockgate 28 in clock circuit 15 provides counting pulses to counter 26. Separate timing gates TG-1 to TG-12 are responsive to the count in counter 26 for controlling the length of each terminal. When timing gate TG-1 (Grn) reaches COUNT UP, the green interval expires and timing gate TG-1 (Grn) forwards an ADVANCE COMMAND to drive controller 20 drum through advance gate 30. Drive 16 is actuated causing drum 12 to advance. As the trailing edge of the interval aperture Ap-1 passes photodetector PD-1 (Grn), PD-1 is deactivated turning off the green traffic light in box 24. Simultaneously drum 12 approaches the next angular position bringing longitudinal segment LS-2 into alignment with the photodetector array. The leading edge of interval aperture Ap-2 exposes photodetector PD-2 (Yellow) to light source 18. PD-2 is activated and provides a HALT COMMAND to drive controller 20 for halting drum 12 in the second angular position. PD-2 also energizes the yellow light in box 24. The RESET COMMAND from controller 20 to counter 26 initiates the timing of the yellow interval. If preferred the yellow light maybe energized during the latter portion of the green interval to provide a short overlap warning period. This overlap between the green and yellow intervals may be established by locating the leading edge of yellow interval aperture Ap-2 at a position on drum 12 in advance of the trailing edge of green interval aperture Ap-1. The green light would remain energized for the short time period required for drum 12 to advance through the overlap zone. Alternatively, the deenergization of the green light may be delayed electronically causing the green interval to extend into the initial portions of the yellow interval. When yellow timing gate TG-2 has reached COUNTUP, it provides an ADVANCE COMMAND to controller 20 through advance gate 30 causing drum 12 to advance towards the third angular position. Photodetector PD-3 (Red) is activated by light through red interval aperture Ap-3 and energizes the red light in box 24. Timing gate TG-3 (Red) controls and optional TIMED RED interval during which the traffic phases are ALL RED to permit traffic from the previous green phase to clear the intersection prior to starting the green interval of the next phase. At the termination of the TIMED RED interval drum 12 rotates to activate photodetector PD-4 (Grn) which energizes the next phase green light in another light box not shown. Light box 24 is associated with the PD-1 (Grn), PD-2 (Yel), and PD-3 (Red) phase, and goes into SOLID RED during all the phases remaining in the traffic cycle. SOLID RED is usually the predominent status for any given traffic phase, and is interrupted once each traffic cycle by the GREEN, YELLOW, and TIMED RED states. A fixed TIMED RED may be provided by eliminating the aperture Ap-3 and timing gate TG-3 for the red interval, and under lapping the yellow aperture Ap-2 with the green aperture Ap-4 of the next phase. The trailing edge of Ap-2 (Yel) deenergizes the yellow light prior to energization of the next phase green by the leading edge of Ap-4 (Grn). The intervening nonapertured period of drum advance is TIMED RED (fixed) and is merged with SOLID RED.

Program drum 12 is provided with a homing circuit 32 for periodically coordinating controller 10 with other traffic controllers or for START UP after a period of FLASH operation. Homing track Tr-H has a homing aperture Ap-H which cooperates with a homing photodetector PD-H to advance drum 12 to the homing or START-UP position. During HOMING operation, homing circuit 32 controls drive controller 20 and overrides the HALT COMMANDS generated by photodetectors PD-1 through PD-12 as drum 12 advances to the homing position.

Timer 14 provides a separate time period for each color interval by means of timing gates TG-1 through TG-12. Each timing gate reaches COUNT UP as determined by conductive pins 40 inserted into pin boards PB-1 through PB-12. The pinned terminals of PB-1 connect selected timed outputs of counter 26 to timing gate TG-1, inputs. Counter 26 generates the timed outputs by counting pulses from a pulse source 42 through clock gate 28. Pulse source 42 may be any suitable source or generator of periodic signal to the clock input of clock gate 28. Sixty cycle line signal is readily available and is the basis for the operation of counter 26 which converts sixty cycle line signal into timed output pulses having a wave length of ¼ of a second and multiples thereof. Counter 26 has a four stage input portion 44 which counts clock pulses from clock gate 28. At the initiation of the seventh count the output of stage four changes state temporarily, disabling clock gate 28 through a feedback or disable loop 46. The seventh clock pulse is split into two shorter pulses causing the input portion 44 of counter 26 to double count (see FIG. 5). Every fifteenth clock pulse out of clock gate 24 is likewise split. Splitting occurs each time the fourth stage of input counter 44 makes a change of state in the same direction as after the seeventh clock pulse. Every 15 pulses or ¼ second time period from source 42 is counted as 16 pulses by input counter 44.

Stage five of counter 26 changes state every eighth pulse from gate 28 establishing a 16 pulse complete cycle period of ¼ second for that stage. The fifth through fourteenth stages of counter 26 form an output counter 48 which provides timed outputs having periods formed by multiples of the one quarter second fundamental period of stage five. Selected timed outputs are connected to the input of each timing gate by pins 40 plugged into the pin board associated with that timing gate. For example timing gate TG-1 (Grn) is pinned to the 4 second and 8 second outputs of output counter 48 as indicated by bold lines in FIG. 1. The green interval is the sum of these periods — 12 seconds. Timing gate TG-2 (Yel) is pinned to the 1 second and 2 second outputs totaling 3 seconds and timing gate TG-3 (Red) is pinned to the first three outputs of counter 44 (¼, ½, and 1) forming a TIMED RED of 1¾ seconds.

The timed outputs are initially all low and become high at the first change of state as counter 44 advances. Thereafter the timed outputs are high during the first half cycle of their respective periods and low during the second half. When all of the inputs to timing gate TG-1 are high — that is the 4 second and 8 second pinned inputs plus the input from photodetector PD-1 — gate TG-1 is enabled and provides a high output of STOP COUNT COMMAND to the stop input of clock gate 28. The high timing gate output passes through a STOP inverter 50 and becomes low at the STOP input to disable clock gate 28 and stop counter 48. The high output of TG-1 (Grn) also appears at the ADVANCE input to advance gate 30. The HALT and HOLD input to gate 30 are also high at this time. Gate 30 is enabled and provides an ADVANCE COMMAND to drive controller 20 to turn drum 12. The HALT input to advance gate 30 is high because photodetector PD-1 (Grn) is energized, and the HOLD input to advance gate 30 is high. Thus, timed outputs for output counter 48 enable the timing gate causing drum 12 to turn and counter 26 to stop. When drum 12 turns one increment, the yellow photodetecor PD-2 is activated halting drum 12 and resetting counter 26. The yellow interval proceeds until all the pinned inputs to timing gate TG-2 (Yel) are high precipitating the red interval. The pinned inputs of all the timing gates TG-1 through TG-12 simultaneously receive the timed outputs of output counter 48; but only a single timing gate can be enabled by them during a given interval. Each timing gate has its pinned inputs plus a separate control input (last one on the right) which does not pass through the pin board. The control input is directly responsive to the photodetector for that interval. The photodetector for that interval must be activated in order for the control input to be high, and only one photodetector is activated at one time. Therefore, even though all the timing gates simultaneously receive the timed outputs for counter 48, only the timing gate with the activated photodetector can become enabled. Timer 14 and clock 15 are described in more detail in U.S. Pat. No. 3,882,404 filed Nov. 29, 1973 by R. W. Bell and entitled "Timing and Frequency Conversion, Method and Apparatus."

Holding circuit 52 provides a HOLD GREEN COMMAND to advance gate 30 for extending the green interval of a phase that experiences heavy rush hour traffic. In addition, the HOLD GREEN COMMAND may coordinate the green intervals of a number of consecutive intersections requiring timed green lights. Advance gate 30 has three inputs, HALT, ADVANCE and HOLD, all of which must be high for enablement. The HALT input is normally high and goes low to stop drum 12 with each aperture leading edge and photodetector activation. The ADVANCE input is normally low and goes high to start drum 12 when the timing gate for the activated phase is enabled. The HOLD input is normally high, and is dropped by the HOLD COMMAND for hold green 52 to prevent the advance of drum 12 even after the interval timing gate has reached enable, and stopped clock gate 28. During the HOLD COMMAND the drum is motionless in a green position and the clock and counter are stopped. When the HOLD COMMAND is removed, the HOLD input goes high enabling advance gate 30, drive controller 20 energized drive 16 and resets counter 26, and normal operation is reestablished.

Referring to FIG. 2, there is shown an example of drum 12 laid out in a memory sheet 60 to better illustrate the positions of the interval apertures. Sheet 60 accomodates four traffic phases (A, B, C, and D) each having a Green (G), YELLOW (Y), and a TIMED RED (R) interval occupying vertical tracks 1 through 12. In addition sheet 60 has an auxiliary phase E on tracks 13, 14, and 15 which are currently unassigned and are available for modification and expansion traffic controller 10. Track 16 contains a modified homing circuit employing an electrical contact 61 mounted in track 16 which cooperates with a stationary contact or conducting brush (not shown) mounted next to the drum and engaging track 16. The interface between the mechanical memory device and the electrical sensors may take on many other forms in addition to the aperture-photodetector of FIG. 1 and the contact-brush of FIG. 2. For example the drum may have a ferrous oxide surface which is selectively magnitized to provide the prepositioned memory structure. The magnetic drum is then read back by a play backrecording head to control the sequence of traffic events at the intersection.

The sequence is easily reprogrammed by erasing and recording using convention tape recording techniques. Both the magnetic embodiment and the aperture-photodetector embodiment of FIG. 1 have the advantage of a nominal contact-nominal wear feature between the moving memory portion and the stationary sensor portion.

Memory sheet 60 of FIG. 2 is formed by a continuous matrix of prescored aperture blanks 62 which may be readily punched out to locate the interval apertures 64 in the desired sequence. As can be seen from FIG. 2, when memory sheet 60 is formed into a drum and rotated in the direction of the arrow the first apertures encountered by the light detectors are the phase A green, yellow, and red apertures. After the termination of the red interval of phase A, the phase B apertures are detected establishing the phase B green yellow and red traffic intervals. The next aperture set in the sequence is phase D which is positioned prior to the phase C aperture set. The phase order is determined by the relative positions of the apertures along the direction of motion. The longitudinal segments 1 through 20 are sequentially read by the light detector array to define the traffic light sequence. The particular track in which an aperture is located identifies which light detector is associated there with.

After termination of the last interval defined by sheet 60 — phase C (red) — empty or unassigned longitudinal segments 17 through 20 are encountered producing a four increment dead space 66. The drum rotates through dead space 66 without interruption during the phase C red interval until the phase A green aperture is encountered marking the beginning of a new traffic cycle. Unassigned segments 17 through 20 may program an auxiliary phase E which would occur at the end of each traffic cycle after phase C but before phase A of the next cycle. In the meantime, dead space 66 and auxiliary phase E is skipped each cycle without affecting the timing of active phases A, B, D, and C.

The ability of traffic controller 10 to skip longitudinal segments is the principles behind the demand phase in which a phase is active only on DEMAND from a street sensor as shown in FIG. 3. The sensing of traffic in the demand lane (plus other conditions) enables demand gate 70 which supplies power to LEDs 72G, 72Y, and 72R. When an aperture appears between LED 72G and its associated photo responsive transistor 74G, the transistor is activated and turns on an SCR network 76G to energize the Green light. Transistors 74Y and 74R are activated in sequence to energize the yellow and red lights respectively. The red light established by LED 72R and transistor 74R is the TIMED RED, the All RED interval for clearing traffic from the intersection. The SOLID RED condition is established in this embodiment by red gate 78 and diodes 79. Gate 78 is enabled when both inputs are high, when neither transistor 72G or 72Y is activated. The output of gate 78 passes through diode network 79 to energize the red light in the absence of a green or yellow interval initiated by DEMAND through gate 70.

In FIG. 4 the memory device is formed by a suitable annular surface such as endless belt 80 driven by drive wheels 82. Belt 80 has more longitudinal segments than can be conveniently provided on drum 12 of FIG. 1. Two or three traffic cycles may be incorporated within a single revolution of annular surface 80.

Further, belt 80 is read by photo detectors 84 which are spaced along the direction of motion in contrast to FIG. 1 where photo detectors PD 1 through PD 12 were positioned in an array extending longitudinally along drum 12 across the direction of motion. In the spaced array 84 of FIG. 4, the traffic light sequence is defined by the relative positions of the spaced light detectors as well as the relative position of the apertures on endless band 80.

FIG. 5 shows another modification of the memory device-to-reader interface. Notched discs 90 turn on incrementally driven shaft 92. An array of LED-photo transistor pairs 94, one cooperating with each disc, straddle discs 90 as shown in enlarged fragmentary view 6. As the notch passes between the LED-transistor pair 94, the transistor responds to the LED light to initiate phase event in the traffic cycle. In the cylinder embodiment of FIG. 1, prepositioned apertures controlled the traffic sequence by initiating each colored interval event in a prescribed sequence. In the disc embodiment of FIG. 4, prepositioned notches initiate only the phase events. The sequence of the green, yellow, and red interval events within the phase is fixed by custom and does not change. Each interval event is not required to have an actual prepositioned structure on the memory device. Instead, the shorter colored events may be initiated by a suitable self progressing device such as sequencing logic circuit 96. Enablement of the green or yellow timing gate does not advance discs 90; but instead progresses the status of the flip flop in logic circuit 96. Only enablement of the red timing gate advances discs 90.

An example of pulse source 52 is shown in FIG. 5 as a halfwave rectifier 98 and pulse amplifier 100 which provides 60 Hertz pulses to clockgate 28. The spacing between adjacent clock pulses at the output of clockgate 28 causes a CLOCKSKEW limitation of time accuracy of less than 1/60th of a second. This 1/60th of a second CLOCKSKEW time is negligable when compared to the typical interval time durations of many seconds. Further, by providing full wave rectification in pulse source 52, the CLOCKSKEW may be reduced to less than 1/120th of a second. Doubling the clock speed to 120 Hertz has the further advantage of having the periods of the timed outputs of stages five to fourteen of output counter 98.

An example of disable loop 46 is shown in FIG. 5 as formed by a disable inverter 102 and two RC networks 104 and 106. The initially low output of stage four passes through disable invertor 102 and appears at the disable input to clock gate 28 as a high. In addition the disable input is biased high by pullup RC circuit 104. At the start of the seventh input pulse from source 52 the output of clock gate goes high and the output of stage four goes high. The disable input to clock gate 28 does not go low however, until the capacitor in delay RC network 108 has discharged sufficiently to flip inverter 102; at which time the capacitor in pullup network 104 discharges causing a disabling low at the disabling input. The seventh clock pulse is foreshortened and advances counter 48. Shortly thereafter the pull up capacitor charges rebaising the disable input to its normal high and enabling gate 28. The output of gate 28 is high for the remainder of the seventh input pulse. The seventh input pulse from source 52 is split into two clock pulses out of clock gate 28 as shown by the waveform diagram on FIG. 5 near gate 28 output. Thereafter, the counter advances an additional count ahead of pulse source 52 each time the output of stage four goes high — that is every fifteenth input pulse. Fifteen input pulses produce 16 clock pulses establishing the ¼ second period for the timed output of stage five.

It will be apparent to those skilled in the art that the objects of this invention have been achieved by providing a traffic controller which may be easily reprogrammed by replacing the intregal memory device containing the prepositioned event initiating structures. Drum 12 and discs 90 may be removed as a unit and replaced by another drum or disc with different aperture and notch configurations. Because the apertures are fixed on the drum surface, synchronization between the traffic events and the memory structures are maintained. The drum does not continuously rotate but stops after each event is initiated during the timing of the event. Varying the lengths of a particular colored interval by relocating pins 40 does not affect the time duration of the preceding or subsequent colored interval. The absence of a physical contact requirement between the memory device and the sensor array eliminates undesireable friction and misalignment loads. The radial gap between drum 12 or discs 90 and the photo sensors is not a sensitive dimension.

Clearly, various changes may be made in the embodiments and applications shown herein without departing from the concept of the present invention. For example the present encode is useful in applications unrelated to traffic control where a resource is to be distributed on a time basis. In fluid control applications, such as sprinkling systems, the memory device may be used to determine the sequence in which portions of a large field will receive water. The timing gates and pin boards may be used to conveniently control the watering period.

What is claimed and desired to be protected by U.S. Letters Patent is:

1. A traffic controller sequencer for establishing the order and duration of traffic light events in a traffic light cycle, the sequencer comprising:
   a sequence means having prepositioned structures thereon corresponding to the traffic light events;
   reading means responsive to the prepositioned structures;
   drive means for providing relative motion and periods of nonmotion between the sequence means and the reading means,, permitting the reading means to sequentially read the prepositioned structures on the sequence means for establishing the sequence of traffic light events;
   binary counter means having a sequential series of stages, each of which is periodically activated on a time base which doubles in duration with each subsequent stage causing each stage of the series to have a time base which is a power of two multiple of the first stage of the series;

a plurality of separately adjustable timer means, one associated with each traffic light event for independently establishing the length of the period of nonmotion for that traffic light event, each timer means having a series of inputs corresponding to at least some stages in sequence in the series of sequential stages, selected stages of the series of sequential stages being electrically connected to the corresponding input in the series of timer inputs for each timer means for establishing the period of nonmotion for that timer means which is equal to the sum of the time bases of the selected stages; and drive controller means responsive to the plurality of timer means for initiating the relative motion, and responsive to the reading means for terminating the relative motion when a prepositioned structure is read.

2. The sequencer of claim 1, wherein the reading means is a plurality of sensors, one corresponding to each traffic light event.

3. The sequencer of claim 2, wherein the relative motion defines a plurality of scanning tracks on the sequence means extending along the path of relative motion, one scanning track associated with each sensor.

4. The sequencer of claim 3, wherein the plurality of sensors forms a linear array of sensors extending across the sequence means traversing the direction of relative motion.

5. The sequencer of claim 3, wherein the drive controller means is responsive to one of the plurality of timer means to initiate the relative motion at the end of each traffic event, causing the reading means to read the next prepositioned structure which terminates the relative motion and starts the timing of the next traffic event.

6. The sequencer of claim 3, wherein:
the sequence means is a selectively apertured annular surface enclosing a light source; andd the reading means is a plurality of photo detectors proximate the annular surface responsive to the light passing through the apertures as the annular surface is rotated past the photo detectors.

7. The sequencer of claim 6, wherein the annular surface is a cylinder incrementally rotated by the drive means.

8. The sequencer of claim 3, wherein:
inhibiting means is provided for preventing reading of certain of the prepositioned structures causing the traffic light event associated therewith to be omitted from the traffic light cycle; and demand means is provided responsive to the traffic conditions for temporarily countering the inhibiting means and introducing the omitted events for at least one traffic light cycle.

9. The sequencer of claim 3, wherein the traffic event is a traffic light colored interval, and the sequence means has a prepositioned structure thereon corresponding to the colored intervals.

10. The sequencer of claim 3, wherein the traffic event is a traffic light phase comprising colored intervals, and the sequence means has prepositioned structures thereon corresponding to the traffic phase.

11. The sequencer of claim 3, further comprising a homing circuit for returning the sequence means to a homing posittion.

12. The sequencer of claim 3, wherein each one of the plurality of timer means provides a timed event period initiated by one of the plurality of sensors, after which the one timer means actuates the drive controller to establish the relative motion which initiates the next traffic event.

13. The sequencer of claim 12, further comprising a hold green circuit which overrides the plurality of timer means to prevent the relative motion thus delaying the subsequent traffic event sequence.

14. The sequencer of claim 3, wherein each one of the plurality of timer means is a multi-input gate circuit.

15. The sequencer of claim 14, wherein each traffic light event has a sensor and a timing gate circuit associated therewith, and each timing gate circuit has a control input responsive to the associated sensor.

* * * * *